United States Patent [19]
Stanger et al.

[11] Patent Number: 6,097,435
[45] Date of Patent: *Aug. 1, 2000

[54] VIDEO SYSTEM WITH SELECTABLE BIT RATE REDUCTION

[75] Inventors: Leon Stanger, Farmington, Utah; Chao-Kung Yang, Huntington Beach, Calif.; Robert H. Plummer, Seattle, Wash.

[73] Assignee: Hughes Electronics Corporation, El Segundo, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/792,589

[22] Filed: Jan. 31, 1997

[51] Int. Cl.[7] .............................. H04N 7/24; H04N 7/26
[52] U.S. Cl. ..................... 348/387; 348/390; 370/468; 370/477
[58] Field of Search ................................. 348/387, 390, 348/7; 370/468, 477; H04N 7/24, 7/26

[56] References Cited

U.S. PATENT DOCUMENTS

| | | | |
|---|---|---|---|
| 4,587,514 | 5/1986 | Schas et al. ............... | 340/347 DD |
| 4,626,829 | 12/1986 | Hauck ....................... | 340/347 DD |
| 4,918,523 | 4/1990 | Simon et al. ............... | 358/133 |
| 4,975,771 | 12/1990 | Kassatly ..................... | 358/146 |
| 5,038,389 | 8/1991 | Mizuno ...................... | 382/248 |
| 5,097,261 | 3/1992 | Langdon, Jr. et al. ....... | 341/51 |
| 5,115,309 | 5/1992 | Hang ......................... | 358/133 |
| 5,122,873 | 6/1992 | Golin ........................ | 348/390 |
| 5,128,754 | 7/1992 | Dhein ........................ | 358/105 |
| 5,136,375 | 8/1992 | Citta et al. ................. | 358/133 |
| 5,216,503 | 6/1993 | Paik .......................... | 348/390 |
| 5,231,494 | 7/1993 | Wachob ...................... | 358/146 |
| 5,291,281 | 3/1994 | Paik et al. .................. | 348/384 |
| 5,319,457 | 6/1994 | Nakahashi et al. .......... | 348/387 |
| 5,319,707 | 6/1994 | Wasilewski et al. ......... | 380/14 |
| 5,361,096 | 11/1994 | Ohki et al. . | |
| 5,367,334 | 11/1994 | Nishino ..................... | 348/390 |
| 5,376,968 | 12/1994 | Wu et al. ................... | 348/413 |
| 5,392,223 | 2/1995 | Caci .......................... | 364/514 |
| 5,400,401 | 3/1995 | Wasilewski et al. ......... | 380/9 |
| 5,440,334 | 8/1995 | Walters ...................... | 348/7 |
| 5,442,626 | 8/1995 | Wei ........................... | 370/20 |
| 5,446,916 | 8/1995 | Derovanessian et al. ..... | 395/800 |
| 5,448,568 | 9/1995 | Delpuch et al. ............. | 372/94.2 |
| 5,475,716 | 12/1995 | Huang ........................ | 375/354 |
| 5,479,210 | 12/1995 | Cawley et al. .............. | 348/390 |

(List continued on next page.)

FOREIGN PATENT DOCUMENTS

| | | |
|---|---|---|
| 574 724 A2 | 12/1993 | European Pat. Off. . |
| 615 384 A2 | 9/1994 | European Pat. Off. . |
| 621 730 A2 | 10/1994 | European Pat. Off. . |
| 712 251 A2 | 5/1996 | European Pat. Off. . |
| 273653 | 1/1996 | Japan . |
| 96/13125 | 5/1996 | WIPO . |

OTHER PUBLICATIONS

Abbas et al., "Performance analysis of an ATM statistical multiplexer with batch arrivals", IEE Proc.–Commun., vol. 141, No. 3, Jun. 1994, pp. 190–195.
Anderson et al., "Support For Continuous Media in the Dash

*Primary Examiner*—Howard Britton
*Attorney, Agent, or Firm*—John A. Crook; Michael W. Sales

[57] ABSTRACT

A video broadcast system is provided with an apparatus for processing a plurality of program signals corresponding to, for example, movies or other prerecorded programs, to selectively reduce the bandwidth required to transmit or broadcast the program signals. The signal processing apparatus includes a rate controller for generating a rate reduction factor based upon the data rates of the first and second program signals, a first channel processor coupled to receive the first program signal, and a second channel processor coupled to receive the second program signal. Each of the channel processors includes a data path for selectively reducing the bit rate of the program signals based upon the rate reduction factor.

20 Claims, 8 Drawing Sheets

U.S. PATENT DOCUMENTS

| | | | |
|---|---|---|---|
| 5,495,291 | 2/1996 | Adams | 348/390 |
| 5,499,245 | 3/1996 | Lee et al. | 370/94.2 |
| 5,506,844 | 4/1996 | Rao | 370/84 |
| 5,509,017 | 4/1996 | Brandenburg et al. | 370/112 |
| 5,515,377 | 5/1996 | Horne et al. | 370/94.1 |
| 5,532,744 | 7/1996 | Akiwumi-Assani et al. | 348/390 |
| 5,533,009 | 7/1996 | Chen | 370/17 |
| 5,541,852 | 7/1996 | Eyuboglu et al. | 364/514 C |
| 5,548,532 | 8/1996 | Menand et al. | 364/514 C |
| 5,550,590 | 8/1996 | Sakazawa et al. | 348/387 |
| 5,557,419 | 9/1996 | Muto . | |
| 5,561,791 | 10/1996 | Mendelson et al. . | |
| 5,563,961 | 10/1996 | Rynderman et al. | 382/239 |
| 5,566,208 | 10/1996 | Balakrishnan . | |
| 5,612,742 | 3/1997 | Krause et al. . | |
| 5,629,736 | 5/1997 | Haskell | 348/387 |
| 5,633,683 | 5/1997 | Rosengren et al. | 348/385 |
| 5,646,942 | 7/1997 | Oliver et al. | 370/312 |
| 5,708,664 | 1/1998 | Budge et al. . | |
| 5,754,783 | 5/1998 | Mendelson et al. . | |
| 5,771,316 | 6/1998 | Uz . | |
| 5,793,425 | 8/1998 | Balakrishman . | |
| 5,796,724 | 8/1998 | Rajamani et al. . | |
| 5,861,919 | 1/1999 | Perkins et al. . | |
| 5,862,140 | 1/1999 | Shen et al. . | |
| 5,929,914 | 7/1999 | Normand . | |

OTHER PUBLICATIONS

System[1]", 1990 IEEE, pp. 54–61.

(List continued on next page.)

Beakley, "Channel Coding for Digital HDTV Terrestrial Broadcasting", IEEE Transactions on Broadcasting, vol. 37, No. 4, Dec. 1991, pp. 137–140.

Dixit et al., "Video Traffic Smoothing and ATM Multiplexer Performance", 1991 IEEE, pp. 8B.3.1–8B.3.5.

Eleftheriadis et al., "Optimal Data Partitioning of MPEG–2 Coded Video", 1994 IEEE, pp. 273–277.

Eng et al., "Time–Compression Multiplexing (TCM) of Three Broadcast–Quality TV Signals on a Satellite Transponder", The Bell System Technical Journal, vol. 62, No. 10, Part 1, Dec. 1983, pp. 2853–2863.

Garcia et al., "Statistical Multiplexing Gain Using Space Priority Mechanisms", 1991 IEEE, pp. 27.3.1–27.3.5.

Gemmell et al., "Multimedia Storage Servers: A Tutorial", IEEE, May 1995, pp. 40–49.

Guha et al., "Multichannel Joint Rate Control of VBR MPEG Encoded Video for DBS Applications", IEEE Transactions on Consumer Electronics, vol. 40, No. 3, Aug. 1994, pp. 616–623.

J. Feng et al., *Interleaving schemes for ATM multiplexing of MPEG video sources*, IEEE, 1996, pp. 2315–1317.

Jiro Katto et al., *Mathematical Analysis Of MPEG Compression Capability And Its Application To Rate Control*, IEEE, 1995, pp. 555–558.

P.N. Anirudhan et al., *A Study Of The Host–Network Interface For MPEG Based Desktop Video Conferencing*, IEEE, 1995, pp. 1930–1936.

John Lauderdale et al.,*A New Technique for Transmission of Pre–Encoded MPEG VBR Video Using CBR Service*, IEEE, 1996, pp. 1416–1420.

Haskell et al., "Multiplexing of Variable Rate Encoded Streams", IEEE Transactions on Circuits and Systems for Video Technology, vol. 4, No. 4, Aug. 1994, pp. 417–424.

Haskell et al., "Variable BIT–Rate Video Coding for ATM and Broadcast Applications", 1993 IEEE, pp. I–114—I–116.

Hulyalkar et al., "Advanced Digital HDTV Transmission System for Terrestrial Video Simulcasting", IEEE Journal On Selected Areas In Communications, vol. 11, No. 1, Jan. 1993, pp. 119–126.

Inoue et al., "Encoding and Decoding in the 60MHz NTSC–Compatible Widescreen Television System", IEEE Transactions on Circuits and Systems for Video Technology, vol. 1, No. 1, Mar. 1991, pp. 49–58.

Kao et al., "Time–Multiplexed Analog Transmission of Three Broadcast–Quality Television Channels Through One Satellite Transponder", IEEE Journal On Selected Areas In Communications, vol. SAC–5, No. 4, May 1987, pp. 676–684.

Keesman et al., "Analysis of Joint Bit–Rate Control in Multi–Program Image Coding", SPIE vol. 2308, 1994, pp. 1906–1917.

Krunz et al., "Statistical Characteristics and Multiplexing of MPEG Streams", 1995 IEEE, pp. 455–462.

Kuo, Geng–Sheng, "A New Generalized Framework for VOD Transmission on Future High–Speed BISDN", IEEE Transactions on Consumer Electronics, vol. 42, No. 1, Feb. 1996, pp. 101–111.

Vin et al., "Designing a Multiuser HDTV Storage Server", IEEE Journal On Selected Areas In Communications, vol. 11, No. 1, Jan. 1993, pp. 153–164.

Liew et al., "Video Aggregation: Adapting Video Traffic for Transport Over Broadband Networks by Integrating Data Compression and Statistical Multiplexing", IEEE Journal On Selected Areas In Communications, vol. 14, No. 6, Aug. 1996, pp. 1123–1137.

Pancha et al., "Bandwidth–Allocation Schemes for Variable–Bit–Rate MPEG Sources in ATM Networks", IEEE Transactions on Circuits and Systems for Video Technology, vol. 3, No. 3, Jun. 1993, pp. 190–198.

Panchanathan et al., "Robust Algorithms for Image Transmission over ATM Networks", SPIE vol. 2308, 1994, pp. 1918–1923.

Reininger et al., "Statistical Multiplexing of VBR MPEG Compressed Video on ATM Networks", 1993 IEEE, pp. 919–926.

Robinson et al., "The Influence of Scene Content on Bit–Rate Variations in ATM Video", 5 pages, undated.

Saleh et al., "Simulation Analysis of a Communication Link with Statistically Multiplexed Bursty Voice Sources", IEEE Journal On Selected Areas In Communications, vol. 11, No. 3, Apr. 1993, pp. 432–442.

Tse et al., "Video Aggregation: An Integrated Video Compression and Multiplexing Scheme for Broadband Networks", 1995 IEEE, pp. 439–446.

Tse et al., "Statistical Multiplexing of Multiple Time–Scale Markov Streams", IEEE Journal On Selected Areas In Communications, vol. 13, No. 6, Aug. 1995, pp. 1028–1038.

Wu et al., "Computational Methods for Performance Evaluation of a Statistical Multiplexer Supporting Bursty Traffic", IEEE Transactions On Networking, vol. 4, No. 3, Jun. 1996, pp. 386–397.

Technology Demonstration by DMV, Imedia and Silicon Graphics, NAB '96, Apr. 15–18, 2 pages.

Imedia Corporation, Company Backgrounder, Apr. 1996, 6 pages.

Imedia Corporation, "*Imedia StatMux*™ Increased Channel Utilization: Many More Channels" (undated), 5 pages.

Imedia Corporation, "Imedia StatMux™—24 Digital Channels in the Space of 1 Analog Channel" (undated), 9 pages.

VIDEO SYSTEM WITH SELECTABLE BIT RATE REDUCTION

BACKGROUND OF THE INVENTION

The present invention relates to a video broadcast system having the capability of providing selectable bit rate reduction of a plurality of program signals.

Conventional video broadcast systems for transmitting video signals from a central location to a plurality of remote viewing locations may be of several different types, including cable television systems and satellite-based broadcast systems. Since the overall bandwidth of a video broadcast system is limited, there is a limit to the number of video channels that can be included in a broadcast transmission.

U.S. Pat. No. 5,216,503 to Paik, et al. discloses a statistical multiplexing apparatus which is used to selectively compress a plurality of video signals prior to being broadcast. In the Paik, et al. system, each video signal is provided to an encoder prior to being broadcast. Each encoder is connected to a respective buffer, which is in turn connected to a multiplexer. Each encoder is connected to a controller, which generates coding level commands to control the degree to which the encoders compress the video signals.

SUMMARY OF THE INVENTION

The invention is directed to an apparatus for processing a plurality of program signals corresponding to, for example, movies and prerecorded or live programs, to selectively reduce the bit rate required to transmit or broadcast the program signals. The signal processing apparatus includes a rate controller for generating a rate reduction factor based upon the data rates of first and second program signals, a first channel processor coupled to receive the first program signal, and a second channel processor coupled to receive the second program signal.

In accordance with one aspect of the invention, each channel processor includes a first data path providing a first bit rate reduction, a second data path providing a second bit rate reduction which is greater than the first bit rate reduction, and a channel controller for selectively causing the video portion of the program signal to pass through one of the two data paths without passing through the other data path in response to the rate reduction factor generated by the rate controller.

The channel processors may include an input buffer, an inverse quantizer, a quantizer, an output buffer, a switch for causing one of the program signals to pass through the input buffer and the output buffer without passing through the quantizer or the inverse quantizer, and a switch for causing one of the program signals to pass through the input buffer, the output buffer, the quantizer, and the inverse quantizer. Instead of utilizing switches to selectively pass the program signals through the data paths, signal splitters and multiplexers could be used.

The first data path of the channel processors may have means for passing the video signal through the channel processor without decompressing or recompressing it, and the second data path of the channel processor may include means for decompressing the video signal, means for recompressing the video signal, and means for providing the video signal from the decompressing means to the recompressing means. The first data path may provide no bit rate reduction, and the channel processors may include means for comparing the rate reduction factor with a predetermined threshold, and means for causing the first video signal to pass through the first data path if the reduction factor is not less than the predetermined threshold and for causing the first video signal to pass through the second data path if the reduction factor is less than the predetermined threshold.

The rate controller may include means for determining the combined data rate of the first and second program signals and means for determining the rate reduction factor based on the combined data rate. The channel processors may also be provided with a demultiplexer for demultiplexing the program signal into audio and video signals, a delay buffer for providing an adjustable time delay of the audio signal, and a multiplexer for multiplexing the audio signal back together with the video signal.

The signal processing apparatus may be used in a video broadcast system having a multiplexer for multiplexing the program signals, a transmitter coupled to receive the program signals from the multiplexer, a satellite coupled to receive the program signals from the transmitter, a receiver for receiving program signals from the satellite, and a decoder connected to receive program signals from the receiver.

The invention is also directed to a method of processing a program signal which includes the steps of comparing a factor relating to the complexity of a video signal to a threshold, reducing the bit rate of the video signal by a first amount depending on whether the factor is greater than or less than the threshold, and reducing the bit rate of the video signal by a second amount depending on whether the factor is less greater than or less than the threshold.

The method may include the steps of comparing the complexity factor to a second threshold and reducing the bit rate of the video signal by a third amount depending on whether the complexity factor is greater than or less than the second threshold. The method may also include the steps of multiplexing the video signal with a plurality of other video signals at a broadcast location to form a multiplexed signal and broadcasting the multiplexed signal to a plurality of locations remote from the broadcast location.

These and other features and advantages of the present invention will be apparent to those of ordinary skill in the art in view of the detailed description of the preferred embodiment, which is made with reference to the drawings, a brief description of which is provided below.

DETAILED DESCRIPTION OF THE PREFERRED EMBODIMENTS

Figure 1:
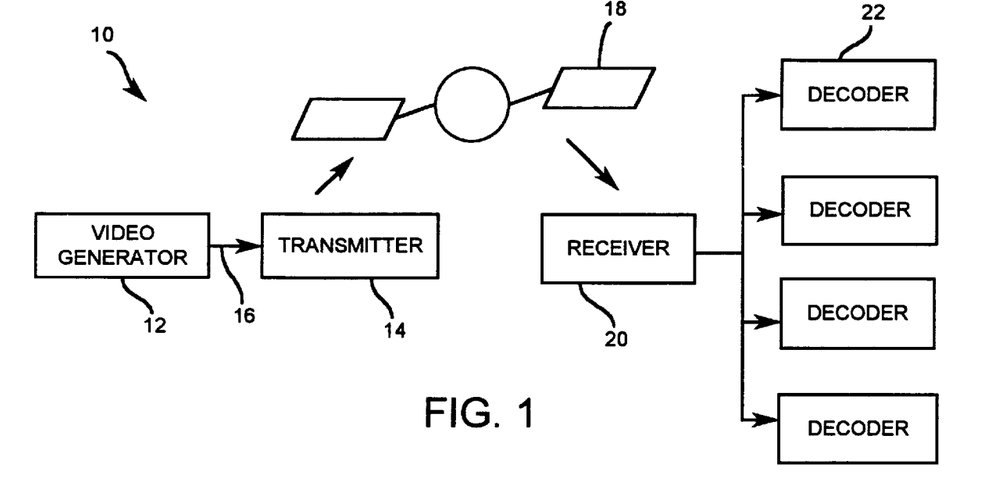
FIG. 1 is a block diagram of a preferred embodiment of a video broadcast system in accordance with the invention.

A preferred embodiment of a video broadcast system 10 in accordance with the invention is illustrated in FIG. 1.

Referring to FIG. 1, the system 10 includes a video generator 12 connected to transmit a multiplexed video data stream to a conventional transmitter 14 via a data link 16. The transmitter 14 transmits the video data stream to a satellite 18, and video data is broadcast by the satellite 18 to a plurality of conventional receivers 20, one of which is shown in FIG. 1. Each receiver 20 may correspond to a house or a multiple dwelling unit, such as an apartment building. Where the receiver 20 is used for a multiple dwelling unit, the receiver 20 is connected to a plurality of decoders 22, each of which corresponds to a separate dwelling unit within the multiple dwelling unit.

Figure 3:
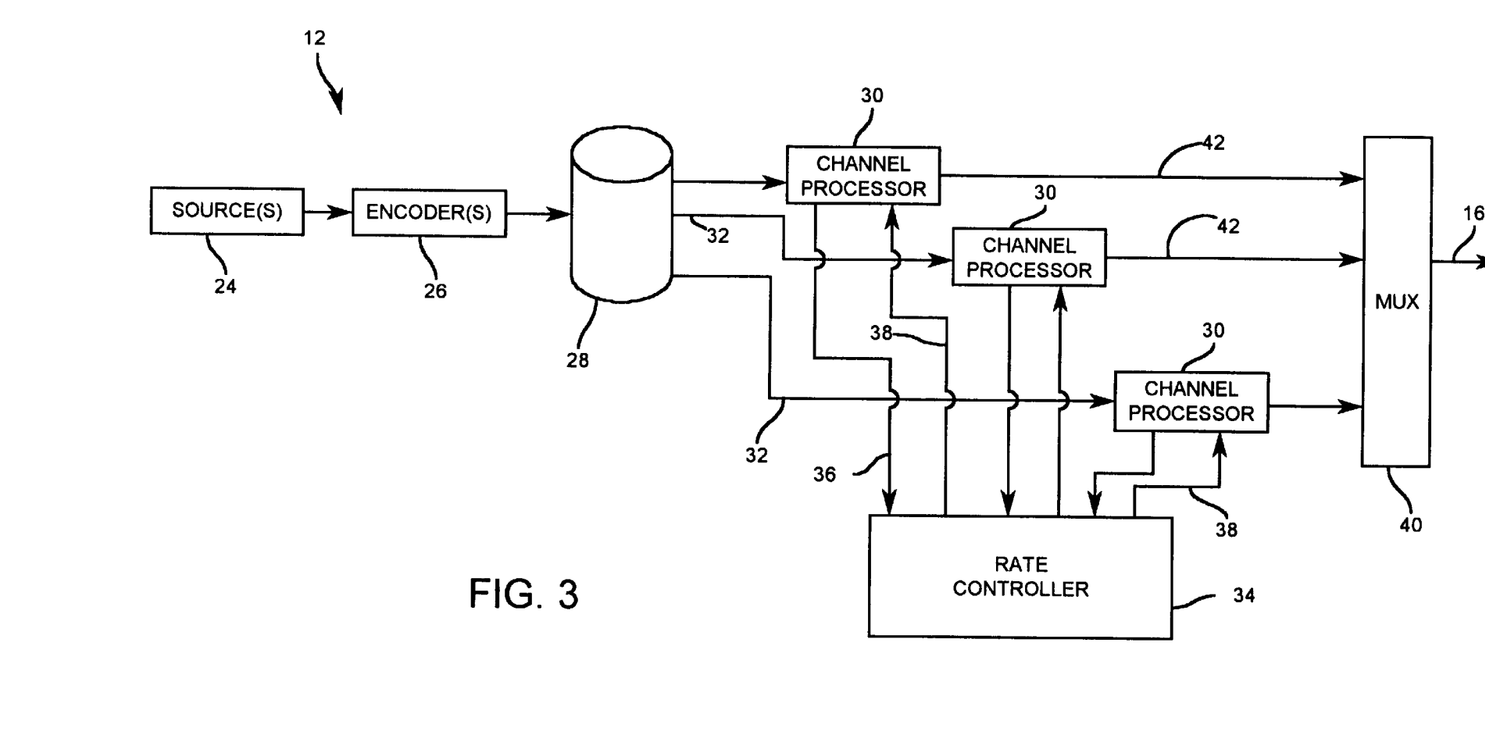
FIG. 3 is a block diagram of the video generator shown schematically in FIG. 1.

FIG. 3 illustrates a block diagram of the video generator 12 shown schematically in FIG. 1. Referring to FIG. 3, the video generator 12 includes one or more source(s) 24 of signals which correspond to audiovisual programs, such as movies and prerecorded or live programs. In the case of a live program, the corresponding source 24 could comprise, for example, a receiver for receiving a broadcast of the live program signal. The program signals are provided to one or more encoders 26 which compress them in a conventional manner. For example, the encoders 26 could be conventional MPEG (Motion Picture Executives Group) encoders which compress the program signals in accordance with a standard MPEG compression protocol.

After being compressed, the program signals are provided to a data storage unit 28, such as one or more video servers. For each individual program represented by the program signals provided to it, the data storage unit 28 generates a separate, variable-bit-rate (VBR) program signal which is provided to a respective channel processor 30 via a respective line 32. Although FIG. 3 illustrates only three channel processors 30, it should be understood that any number of them could be utilized. As described below, each channel processor 30 may reduce the bit rate of its respective program signal by selective decompression and recompression of the signal.

In operation, each channel processor 30 senses the variable bit rate of its associated program signal and transmits a signal representing that data rate to a rate controller 34 via a respective line 36. In response to the rate signals provided to it, the rate controller 34 determines a rate reduction factor and transmits the rate reduction factor to the channel processors 30 via a plurality of lines 38. The rate reduction factor determines the extent to which the channel processors 30 reduce the bit rate of the program signals. After being selectively decompressed and recompressed by the channel processors 30, the program signals are transmitted to a conventional multiplexer 40 via a plurality of lines 42.

Figure 2:
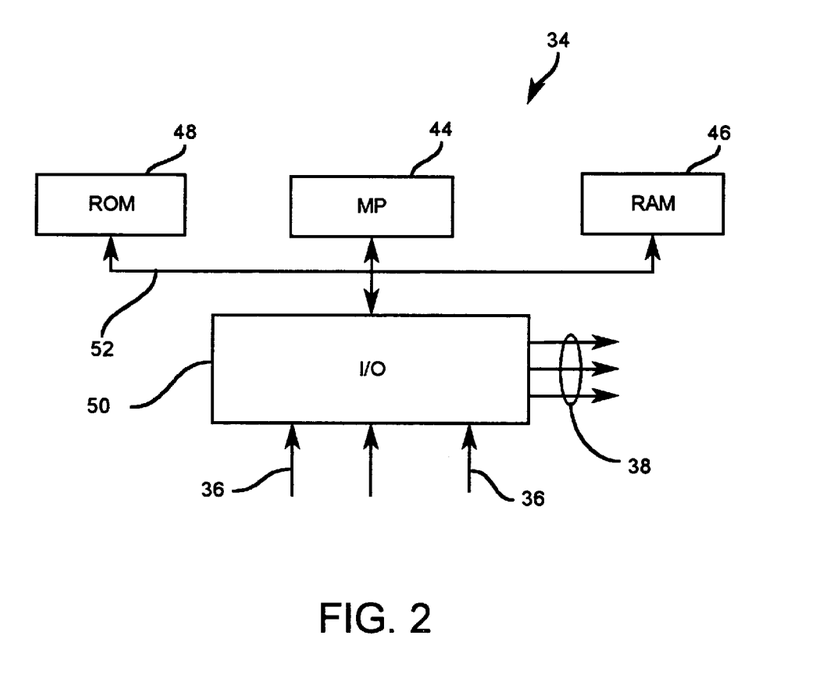
FIG. 2 is a block diagram of a controller used in the video broadcast system.

Referring to FIG. 2, the rate controller 34 may take the form of a conventional computer system having a microprocessor (MP) 44, a random-access memory (RAM) 46, a program memory such as a read-only memory (ROM) 48, and an input/output (I/O) circuit 50, all of which are interconnected via an address/data bus 52. The overall operation of the controller 34 is controlled by a computer program stored in the program memory 48 and executed by the microprocessor 44.

Figure 5:
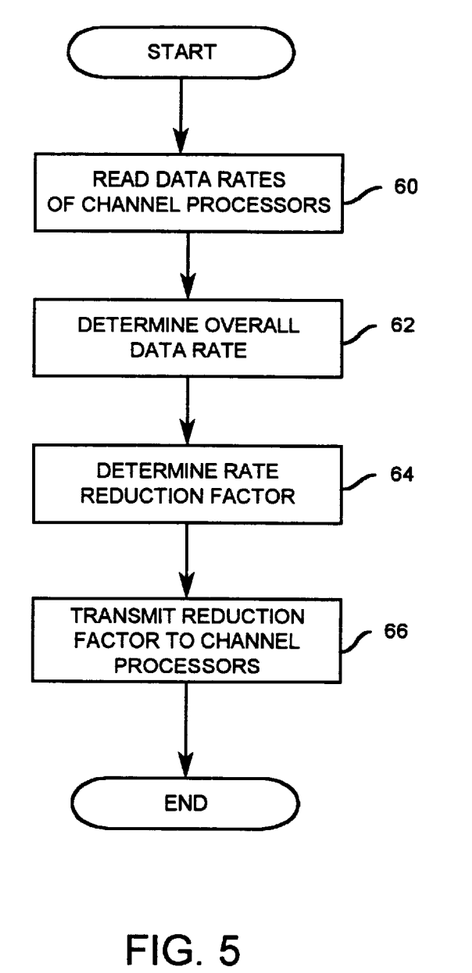
FIG. 5 illustrates a flowchart of the operation of the rate controller shown in FIG. 3.

FIG. 5 illustrates a flowchart of the operation of the rate controller 34. Referring to FIG. 5, at step 60, the rate controller 34 reads the data rates provided to it from each of the channel processors 30 via the lines 36. At step 62, the rate controller 34 determines the overall data rate of all the program signals provided to the channel processors 30 by combining or adding together the data rates from the channel processors 30. At step 64, the rate controller 34 determines the reduction factor. The reduction factor RF may be accomplished, for example, in accordance with the following equation:

$$RF = LESSER\ (1\ or\ MOR/CIR),$$

where RF is the reduction factor (which has a value between 0 and 1), where LESSER represents a function which selects the smaller of the two values enclosed within the parentheses (either 1 or MOR/CIR), where CIR represents the combined incoming bit rate of all of the program signals, and MOR is the maximum outgoing bit rate permissible for all of the program signals.

For example, if the maximum outgoing bit rate is 4 megabits/second (Mbps) and the combined incoming bit rate is 5 Mbps, the LESSER function will select the reduction factor to be 0.8 or 80%, since that value is less than one. Such a reduction factor would cause each of the channel processors 30 to reduce the bit rate of its respective program signal to 80%. If the maximum outgoing bit rate is 4 megabits/second (Mbps) and the combined incoming bit rate is 3 Mbps, the LESSER function will select the reduction factor to be 1 since it is less than 1.33. A reduction factor of 1 will cause no bit rate reduction to be performed by the channel processors 30. At step 66, the reduction factor determined at step 64 is transmitted to the channel processors 30 via the lines 38.

The operation illustrated in FIG. 5 and described above is repeated periodically at a relatively high rate to cause the rate controller 34 to repeatedly transmit an accurate reduction factor to the channel processors 30 at a relatively high rate.

Figure 4:
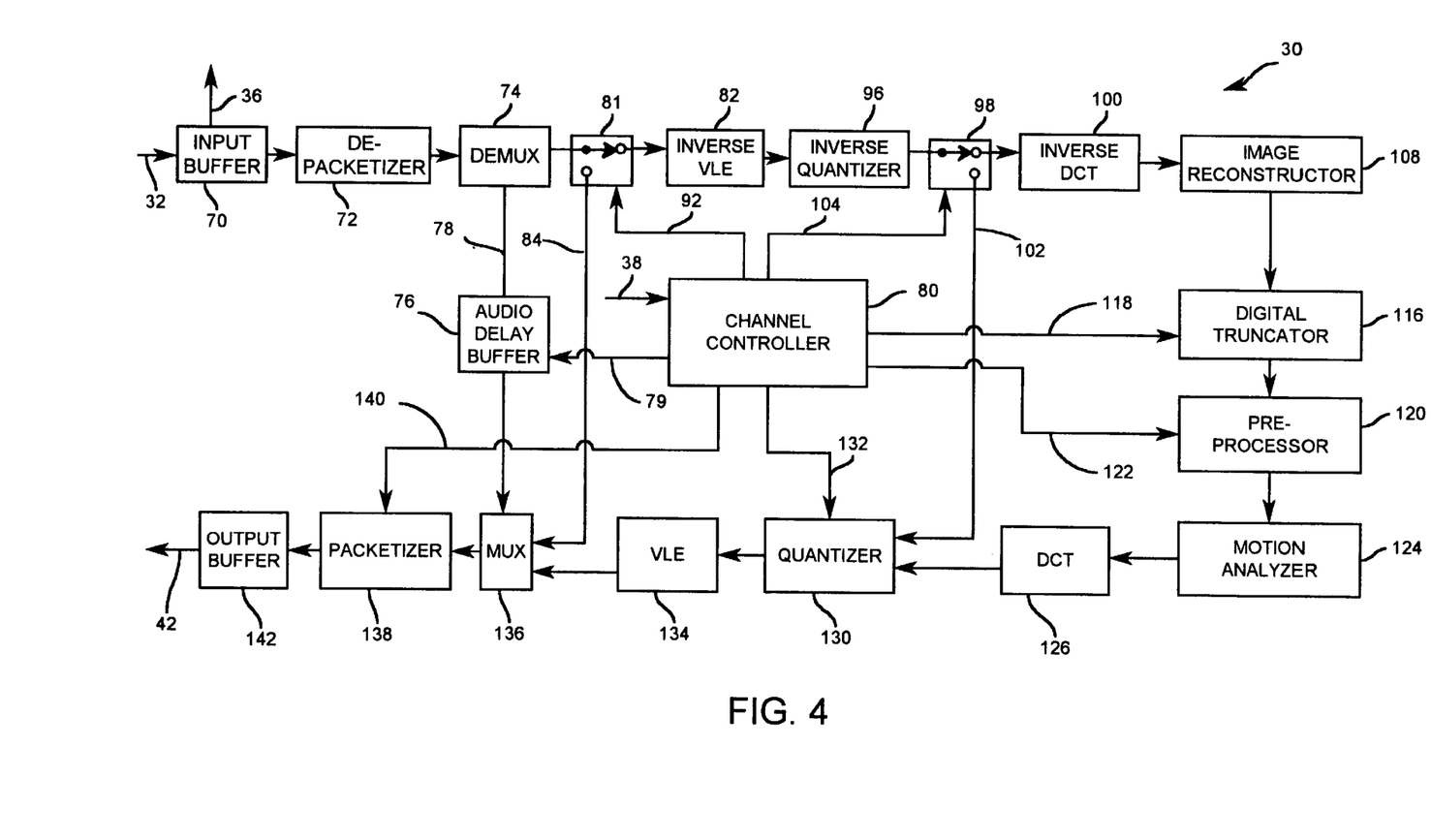
FIG. 4 is a block diagram of a first embodiment of the channel processors shown in FIG. 3.

FIG. 4 is a block diagram of one possible embodiment of each of the channel processors 30. Referring to FIG. 4, the individual program signal provided to each channel processor 30 via the line 32 is transmitted into an input buffer 70, which temporarily stores the program signal and determines the data rate at which it is being input. The program signal stored in the input buffer 70 will be in compressed and packetized form due to its being processed by one of the encoders 26 (FIG. 3). From the input buffer 70, the program signal is provided to a depacketizer 72 which depacketizes the signal, and to a demultiplexer 74 which separates the program signal into a video signal and an audio signal. The audio signal is provided to a delay buffer 76 via a line 78. The delay buffer 76 delays the audio signal for an adjustable time period (so that the audio and video portions of the signal are in sync regardless of the processing delay of the video signal as described below). The duration of the adjustable delay period is controlled by a delay signal generated by a channel controller 80 and transmitted to the delay buffer 76 via a line 79. The channel controller 80 may have substantially the same structure as that shown in FIG. 2 (except with a different number of inputs to and outputs from the I/O circuit).

The video output of the demultiplexer 74 is connected to a three-terminal switch 81 having an input terminal connected to the demultiplexer 74, a first output terminal connected to the input of an inverse variable length encoder (VLE) 82, and a second output terminal connected to a line 84. The switch 81 is selectively controlled by a switching signal generated by the channel controller 80 and transmitted to the switch 81 via a control line 92. Depending on the state of the switching signal, the video signal output from the demultiplexer 74 is transmitted either to the inverse VLE 82 or the line 84.

The inverse VLE 82 is connected to an inverse quantizer 96, which is in turn connected to a second switch 98 having an input terminal connected to the inverse quantizer 96, a first output terminal connected to the input of an inverse discrete-cosine transformer (DCT) 100, and a second output terminal connected to a line 102. The switch 98 is selectively controlled by a switching signal generated by the channel controller 80 and transmitted to the switch 98 via a control line 104. Depending on the state of the switching signal, the video signal output from the inverse quantizer 96 is transmitted either to the inverse DCT 100 or the line 102. The output of the inverse DCT 100 is connected to an image reconstructor 108 which reconstructs the video image.

The depacketizer 72, the inverse VLE 82, the inverse quantizer 96, the inverse DCT 100, and the image reconstructor 108 are all conventional circuits that are typically included in a standard MPEG decoder. Each of thee components 82, 96, 108 performs a different signal-decompression function, and after passing through those circuits, the video portion of the program signal will be in its original, uncompressed form.

The uncompressed video signal output from the image reconstructor 108 is provided to a digital truncator 116 which selectively truncates the binary signals representing the video signal. For example, if the intensity and hue of each pixel of the uncompressed video signal are each represented by a multi-bit binary number, the digital truncator 116 could truncate a variable number of the least-significant bits of the binary numbers representing each pixel. The extent to which the binary numbers representing the video signal are truncated depends on the value of a truncation factor generated by the channel controller 80 and transmitted to the digital truncator 116 via a control line 118.

From the digital truncator 116, the video signal is transmitted to a pre-processor 120 that may include either a programmable low-pass filter or a spatial softening filter circuit (not shown) which may be controlled to affect the number of data bits used to encode the video signal. The filter circuit is controlled by a control signal generated by the channel controller 80 and transmitted to the pre-processor 120 via a control line 122.

The video signal is then transmitted to a motion analyzer 124 which analyzes the video signal on a macroblock-by-macroblock basis and recodes the signal in a conventional manner. From the motion analyzer 124, the video signal is provided to a discrete-cosine transformer (DCT) 126 that converts the video signal into a plurality of transform coefficients, each transform coefficient being represented by a plurality of data bits.

The video signal is then provided to a quantizer 130 which selectively compresses the video signal by reducing a number of data bits from the transform coefficients based upon the magnitude of a quantization factor, which is generated by the channel controller 80 and transmitted to the quantizer 130 via a control line 132. The video signal is then encoded by a variable length encoder (VLE) 134 in a conventional manner.

The video signal is transmitted to a first video input of a multiplexer 136. The other video input of the multiplexer 136 is connected to the line 84 connected to the switch 80. The multiplexer 136 has a third input connected to receive the audio portion of the program signal from the delay buffer 76. The multiplexer 136 combines the audio signal from the delay buffer 76 with the video signal provided to one of its video inputs. The multiplexer 136 may add stuffing bits to the video signal in the event of excess signal capacity.

The program signal is output from the multiplexer 136 to a packetizer 138, which reformulates the program signal into packets suitable for broadcast. If necessary to reduce the bit rate of the program signal, portions of the video signal, such as B-frames, may be dropped, depending on the state of a frame-deletion signal generated by the channel controller 80 and transmitted to the packetizer 138 via a control line 140. After being packetized, the program signal is transmitted to an output buffer 142, and then to the multiplexer 40 (FIG. 3) via the line 42.

The pre-processor 120, the motion analyzer 124, the DCT 126, the quantizer 130, and the VLE 134 are all conventional circuits that are typically included in a standard MPEG encoder. Each of those components 120, 124, 126, 130, 134 performs a different signal-compression function, and after passing through those circuits, the video portion of the program signal will be in recompressed form.

Figure 6A:
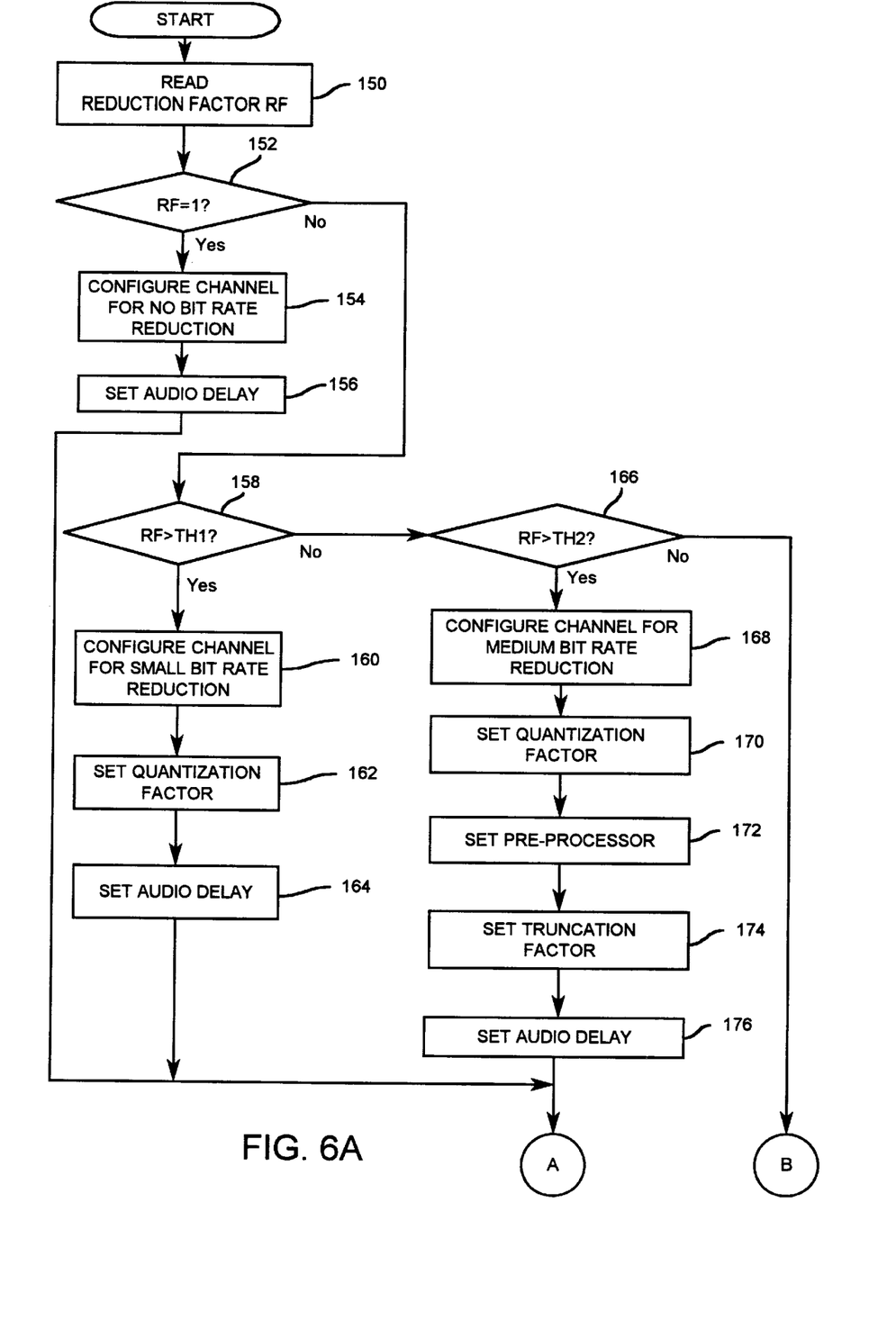
FIGS. 6A and 6B illustrate a flowchart of the operation of the channel controller shown in FIG. 4.

The operation of each channel processor 30 of FIG. 4 is described below in connection with FIGS. 6A and 6B, which illustrate a flowchart of a computer program that controls the operation of the channel controller 80. Referring to FIG. 6A, at step 150, the most recent reduction factor RF transmitted to the channel controller 80 via the line 38 is read. At step 152, the reduction factor, which is in the form of a number between 0 and 1 (representing a percentage), is compared with one to determine whether any bit rate reduction is necessary. If the reduction factor RF is equal to one, meaning that the data rate, or bit rate, of the program signal does not have to be reduced, then the program branches to step 154, where the channel processor 30 is configured to provide a data path having no bit rate reduction.

This is accomplished by setting the switch 81 (FIG. 2) so that it passes the video portion of the program signal from the demultiplexer 74 to the multiplexer 136, where it is recombined with the audio portion of the signal. Consequently, the video portion of the signal does not pass through the circuit components 82, 96, 100, 108, 116, 120, 124, 126, 130 and 134.

At step 156, the adjustable delay for the audio delay buffer 76 is set, via the control line 79, to no delay since the passage of the video portion of the program signal takes negligible time to pass from the demultiplexer 74 to the multiplexer 136.

If the reduction factor was not equal to one as determined at step 152, meaning that some bit rate reduction is required, the program branches to step 158, where the reduction factor RF is compared to determine whether it is greater than a first, relatively high threshold TH1 (e.g. 0.9). If the reduction factor is greater than the first threshold, meaning that only a small bit rate reduction is necessary, the program branches to step 160, where the channel processor 30 is configured to provide a data path which allows a small bit rate reduction to be provided.

This is accomplished by 1) setting the switch 81 (FIG. 2) so that it passes the video portion of the program signal from the demultiplexer 74 to the inverse VLE 82 and 2) setting the switch 98 so that it passes the video portion of the program signal from the inverse quantizer 96 to the quantizer 130 via the line 102. Consequently, the video portion of the signal does not pass through the circuit components 100, 108, 116, 120, 124, and 126.

At step 162, a quantization factor is generated by the channel controller 80 and transmitted to the quantizer 130 via the line 132 so that the bit rate of the video signal is reduced by a relatively small amount. A predetermined quantization factor may be generated in the event the reduction factor is between one and the first threshold TH1, or alternatively, a quantization factor based on the actual value of the reduction factor may be generated. For example, a memory lookup table could be used to store a plurality of ranges of all possible numeric values of the reduction factor and a specific quantization factor for each range of values of the reduction factor.

At step 164, the adjustable delay for the audio delay buffer 76 is set to a slightly larger delay to account for the increased travel time of the video signal through the components 82, 96, 130, 134.

If the reduction factor was not greater than the first threshold TH1 as determined at step 158, meaning that a greater amount of bit rate reduction is required, the program branches to step 166, where the reduction factor RF is compared to determine whether it is greater than a second, lower threshold TH2 (e.g. 0.8). If the reduction factor is greater than the second threshold, meaning that a medium bit rate reduction is necessary, the program branches to step 168, where the channel processor 30 is configured to provide a data path that allows a medium bit rate reduction to be provided.

This is accomplished by: 1) setting the switch 81 (FIG. 2) so that it passes the video portion of the program signal from the demultiplexer 74 to the inverse VLE 82 and 2) setting the switch 98 so that it passes the video portion of the program signal from the inverse quantizer 96 to the inverse DCT 100.

At step 170, a quantization factor is generated by the channel controller 80 and transmitted to the quantizer 130 via the line 132, at step 172 the pre-processor control signal described above is transmitted to the pre-processor 120 via the line 122, and at step 174 a truncation factor is generated by the controller 80 and transmitted to the digital truncator 116.

Like the quantization factor described above, the pre-processor control signal and the truncation factor set at steps 172, 174 could be either predetermined or based on the actual value of the reduction factor. The quantization factor generated at step 170, the pre-processor control signal generated at step 172, and the truncation factor generated at step 174 are selected to cause a medium amount of bit rate reduction.

At step 176, the adjustable delay for the audio delay buffer 76 is set to a still slightly larger delay to account for the increased travel time of the video signal through the additional components 100, 108, 116, 120, 124 and 126.

Figure 6B:
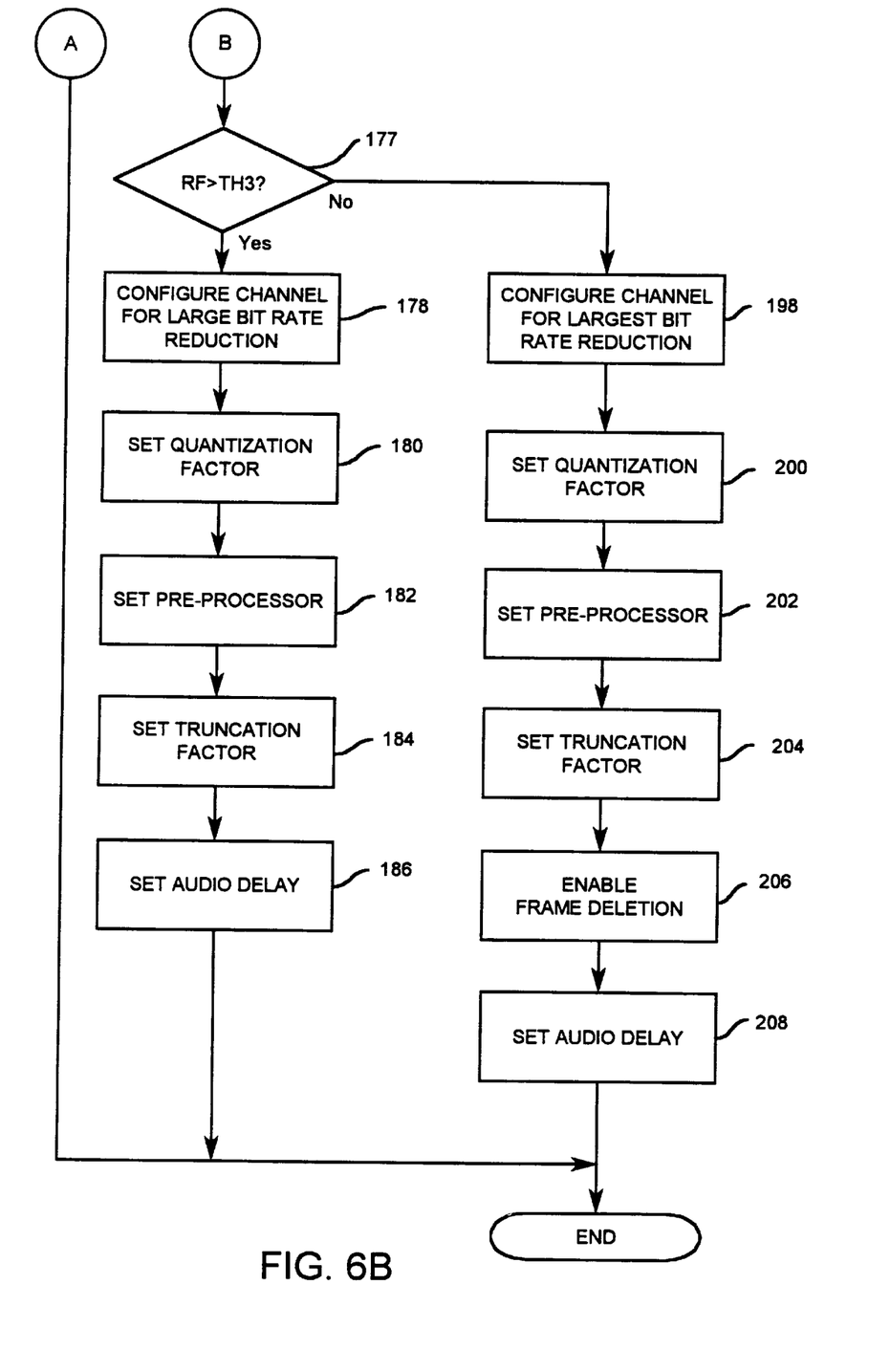

If the reduction factor was not greater than the second threshold TH2 as determined at step 166, meaning that a greater amount of bit rate reduction is required, the program branches to step 177 shown in FIG. 6B, where the reduction factor RF is compared to determine whether it is greater than a third, lower threshold TH3 (e.g. 0.7). If the reduction factor is greater than the third threshold, meaning that a relatively large bit rate reduction is necessary, the program branches to step 178, where the channel processor 30 is configured to provide a data path that allows a large bit rate reduction to be provided.

This is accomplished by setting the switches 81 and 98 in the same manner as described above in connection with step 168 so that the video portion of the program signal passes through the components 100, 108, 116, 120, 124 and 126.

At step 180, a quantization factor is generated by the controller 80 and transmitted to the quantizer 130 via the line 132, at step 182 a pre-processor control signal is transmitted to the pre-processor 120 via the line 122, and at step 184, a truncation factor is generated by the controller 80 and transmitted to the digital truncator 116. The quantization factor generated at step 180, the pre-processor control signal generated at step 182, and the truncation factor generated at step 184 are selected to cause a large amount of bit rate reduction. At step 186, the adjustable delay for the audio delay buffer 76 is set to the same delay as it was at step 176 described above.

If the reduction factor was not greater than the third threshold TH3 as determined at step 177, meaning that the largest amount of bit rate reduction is required, the program branches to step 198, where the channel processor 30 is configured to provide a data path which allows the largest bit rate reduction. This is accomplished via steps 198–208 in the same way described above in connection with steps 178–186, except that an extra step 206 is performed. At step 206, the channel controller 80 enables the frame-deletion signal transmitted to the packetizer 138 via the control line 140, in response to which the packetizer 138 drops some of the frames of the video signal, further reducing the amount of bit rate of the program signal.

The process described above in connection with FIGS. 5 and 6A–6B is performed repeatedly on a periodic basis, e.g. every few video frames, so that the selective reduction of the bit rate of the program signals is dynamically performed to utilize the largest amount of the available bandwidth and maintain the highest quality of programming possible within the available bandwidth constraint. Other repeat periods, either fixed or varying (or including testing every video frame) could be used.

Figure 7:
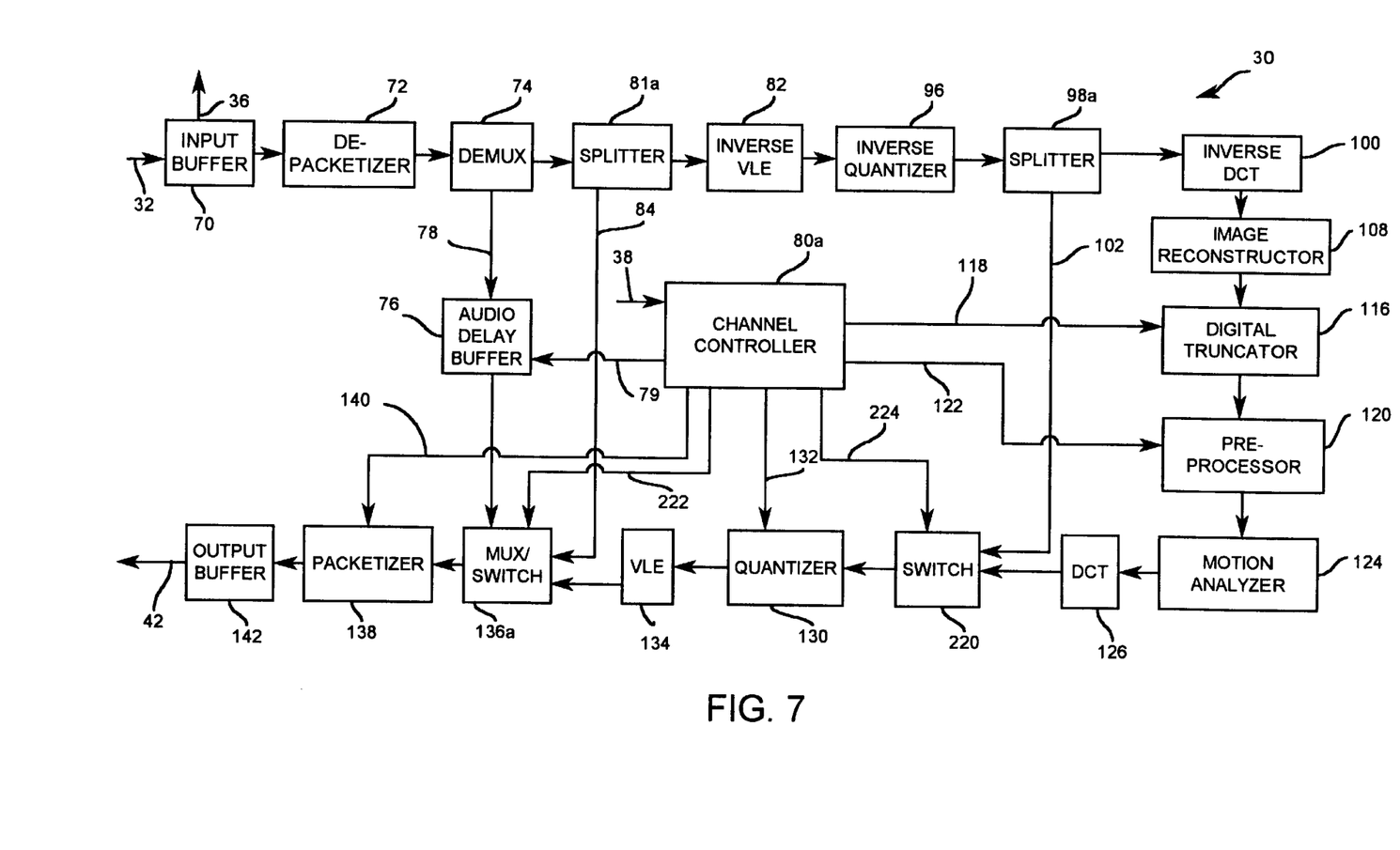
FIG. 7 is a block diagram of a second embodiment of the channel processors shown in FIG. 3.

FIG. 7 illustrates a second embodiment of the channel processors 30. The design and operation of the second embodiment of the channel processors 30 is very similar to that shown in FIG. 4, except for the changes described below. The switches 81 and 98 of the first embodiment shown in FIG. 4 are replaced in FIG. 7 with signal splitters 81a and 98a. Each splitter 81a, 98a causes the video signal at its input to be split into two identical video signal streams. The splitter 81a causes one of its video streams to be provided to a multiplexer/switch 136a and the other of its video streams to be transmitted to the inverse VLE 82. The splitter 98a causes one of its video streams to be provided to a switch 220 and the other of its video streams to be transmitted to the inverse DCT 100.

The multiplexer/switch 136a combines the audio signal from the audio delay buffer 76 with either: 1) the video signal on the line 84 from the splitter 81a or 2) the video signal from the VLE 134, depending on the value of a select signal transmitted from the controller 80a to the multiplexer/switch 136a via a select line 222. The switch 220 transmits to the quantizer 130 either: 1) the video signal on the line 102 from the splitter 98a or 2) the video signal from the DCT 126, depending on the value of a select signal transmitted from the controller 80a to the switch 220 via a select line 224.

The operation of the controller 80a is the same as the operation of the controller 80 described in connection with FIGS. 6A and 6B, except for steps 154, 160, 168, 178, 198. In those steps, instead of transmitting control signals to the switches 81 and 98 (which are nonexistent in the embodiment of FIG. 7), appropriate select signals are transmitted to the switching circuits 136a, 220. In particular, at step 154, the channel controller 80a transmits a select signal to the multiplexer/switch 136a to cause it to combine the audio signal with the video signal from the line 84 so that no bit rate reduction takes place.

At step 160, the channel controller 80a transmits 1) a select signal to the multiplexer/switch 136a to cause it to combine the audio signal with the video signal from the VLE 134 and 2) a select signal to the switch 220 to cause it transmit the video signal from the line 102 to the quantizer 130, so that a relatively small bit rate reduction can be provided.

At each of steps 168, 178, 198, the channel controller 80a transmits 1) a select signal to the multiplexer/switch 136a to cause it to combine the audio signal with the video signal from the VLE 134 and 2) a select signal to the switch 220 to cause it transmit the video signal from the DCT 126 to the quantizer 130, so that further bit rate reduction can be provided.

It should be noted that, unlike the embodiment of FIG. 4, the embodiment of FIG. 7 causes the video signal to pass through all of the decompression and recompression circuits of the channel processor 30.

Figure 8:
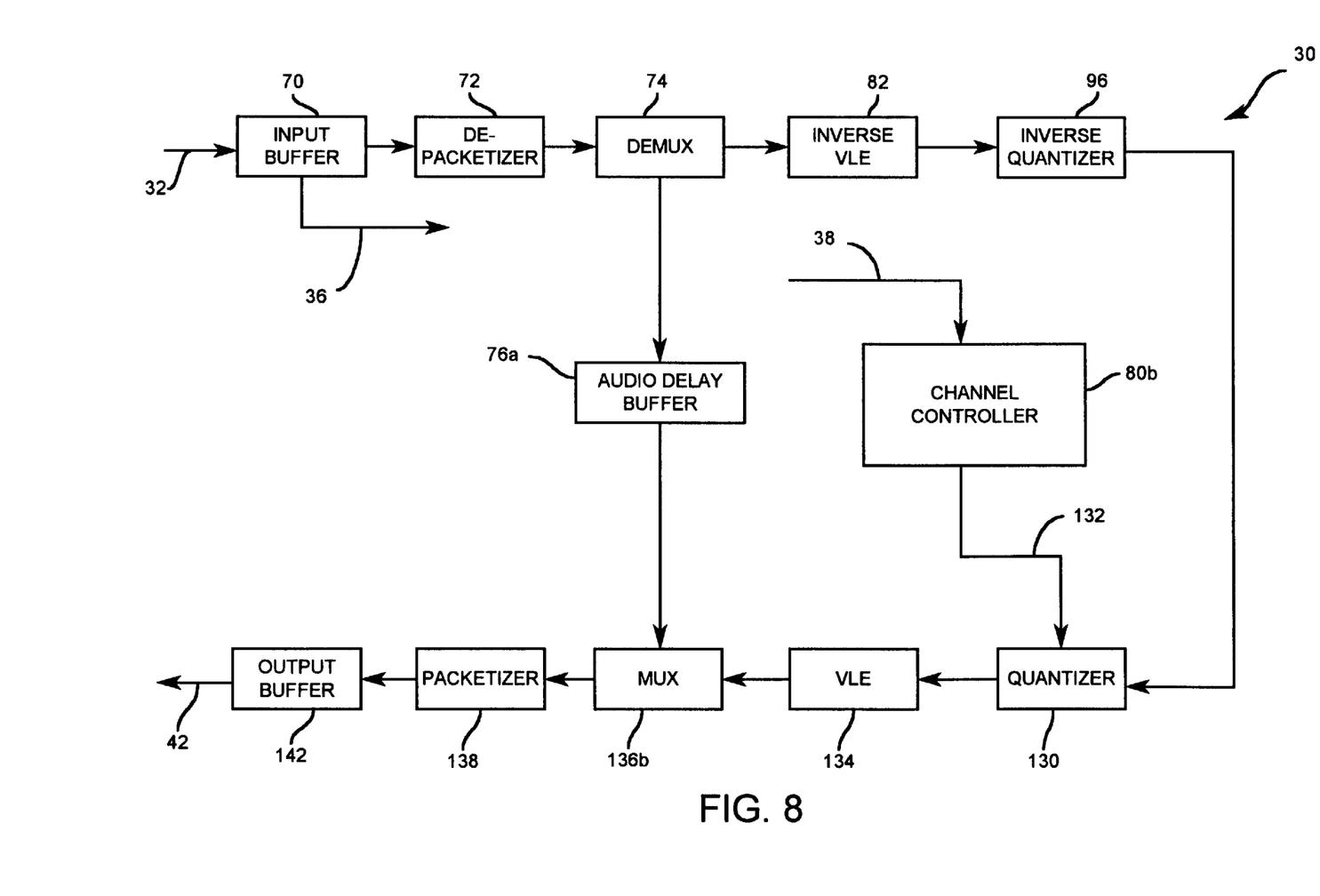
FIG. 8 is a block diagram of a third embodiment of the channel processors shown in FIG. 3.
Figure 9:
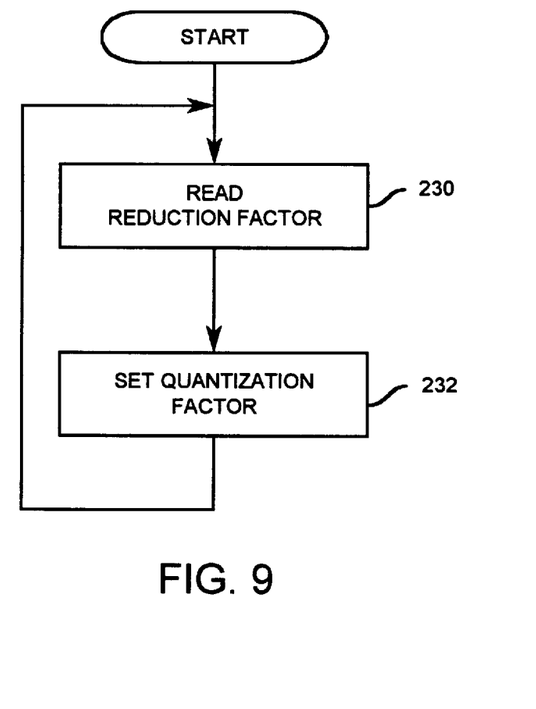
FIG. 9 illustrates a flowchart of the operation of the channel controller shown in FIG. 8.

FIGS. 8 and 9 illustrate a third embodiment of the channel processors 30. Referring to FIG. 8, in the third embodiment the video portion of the program signal passes through the same path regardless of how much bit rate reduction is necessary. In this embodiment, different levels of bit rate reduction are provided by utilizing different quantization factors, each of the quantization factors being based on the actual value of the reduction factor. The channel controller 80b of FIG. 8 may incorporate a memory lookup table which stores a number of different quantization factors, such as ten, and for each quantization factor, the range of numeric values of reduction factors which trigger that quantization factor.

Referring to FIG. 9, the relatively simple operation of the channel processor 30 of FIG. 8 includes reading the current reduction factor from the rate controller 34 at step 230, and then generating and transmitting the corresponding quantization factor to the quantizer 130 at step 232.

The channel processor embodiment shown in FIG. 8 could be modified by adding the inverse DCT 100, the image reconstructor 108, the digital truncator 116, the pre-processor 120, the motion analyzer 124 and the DCT 126 in their positions shown in FIG. 7, along with the control line 118 for the digital truncator 116 and the control line 122 for the pre-processor 120.

In this modified embodiment, the video signal would always pass through the same data path, including all of the decompression and recompression circuits. Numerous different levels of bit rate reduction for the video signal would be provided based upon various combinations of the control signals transmitted to the recompression circuits, including the quantization factor, the pre-processor control signal, the truncation factor, and the control signal provided to the packetizer 138. Each of these control signals could have a particular value based on the value of the rate reduction factor.

Numerous modifications and alternative embodiments of the invention will be apparent to those skilled in the art in view of the foregoing description. This description is to be construed as illustrative only, and is for the purpose of teaching those skilled in the art the best mode of carrying out the invention. The details of the structure and method may be varied substantially without departing from the spirit of the invention, and the exclusive use of all modifications which come within the scope of the appended claims is reserved.

What is claimed is:

1. An apparatus for processing a plurality of program signals including a first program signal having a first data rate and a second program signal having a second data rate, said apparatus comprising:

a rate controller for generating a rate reduction factor based upon said data rates of said first and second program signals;

a first channel processor coupled to receive said first program signal, said first program signal including a first audio signal and a first video signal, said first channel processor comprising:

a first data path providing a first bit reduction rate;

a second data path providing a second bit reduction rate which is greater than said first bit reduction rate; and a channel controller for selectively causing said first video signal to pass through one of said first and second data paths without passing through the other of said first and second data paths in response to said rate reduction factor generated by said rate controller;

a second channel processor coupled to receive said second program signal, said second program signal including a second audio signal and a second video signal, said second channel processor comprising:

a first data path providing a first bit reduction rate;

a second data path providing a second bit reduction rate which is greater than said first bit reduction rate of said first data path of said second channel processor; and a channel controller for selectively causing said second video signal to pass through one of said first and second data paths of said second channel processor without passing through the other of said first and second data paths of said second channel processor in response to said rate reduction factor generated by said rate controller.

2. An apparatus as defined in claim 1 wherein said rate controller comprises:

means for determining the combined data rate of said first and second program signals; and means for determining said rate reduction factor based on said combined data rate.

3. An apparatus as defined in claim 1 wherein one of said channel processors additionally comprises:

an input buffer;

an inverse quantizer;

a quantizer;

an output buffer;

switch means for causing one of said program signals to pass through said input buffer and said output buffer without passing through said quantizer or said inverse quantizer; and switch means for causing one of said program signals to pass through said input buffer, said output buffer, said quantizer, and said inverse quantizer.

4. An apparatus as defined in claim 3 wherein said first channel processor additionally comprises:

a demultiplexer for demultiplexing said first program signal into said first video signal and said first audio signal;

a delay buffer coupled to receive said first audio signal, said delay buffer providing an adjustable time delay of said first audio signal; and a multiplexer for multiplexing said first audio signal together with said first video signal.

5. An apparatus as defined in claim 1 wherein said first data path of said first channel processor comprises means for passing said first video signal through said first channel processor without decompressing or recompressing said first video signal and wherein said second data path of said first channel processor comprises:

means for decompressing said first video signal;

means for recompressing said first video signal; and means for providing said first video signal from said decompressing means to said recompressing means.

6. An apparatus as defined in claim 1 wherein said first data path provides no bit reduction and wherein said channel controller of said first channel processor comprises:
- means for comparing said rate reduction factor with a predetermined threshold; and
- means for causing said first video signal to pass through said first data path of said first channel processor if said reduction factor is not less than said predetermined threshold and for causing said first video signal to pass through said second data path of said first channel processor if said reduction factor is less than said predetermined threshold.

7. An apparatus as defined in claim 1,
- wherein said first channel processor additionally comprises a third data path providing a third bit reduction rate which is greater than said second bit reduction rate,
- wherein said channel controller of said first channel processor selectively causes said first video signal to pass through only one of said first, second and third data paths in response to said rate reduction factor generated by said rate controller,
- wherein said second channel processor additionally comprises a third data path providing a third bit reduction rate which is greater than said second bit reduction rate of said second data path of said second channel processor, and
- wherein said channel controller of said second channel processor selectively causes said second video signal to pass through only one of said first, second and third data paths of said second channel processor in response to said rate reduction factor generated by said rate controller.

8. An apparatus for processing a plurality of program signals including a first program signal having a first data rate and a second program signal having a second data rate, said apparatus comprising:
- a rate controller for generating a rate reduction factor based upon said data rates of said first and second program signals;
- a first channel processor coupled to receive said first program signal, said first program signal including a first audio signal and a first video signal, said first channel processor comprising:
  - a first data path providing a first bit reduction rate;
  - a second data path providing a second bit reduction rate which is greater than said first bit reduction rate;
  - a channel controller for selectively causing the bit rate of said first video signal to be reduced by said first bit rate reduction or said second bit rate reduction in response to said rate reduction factor generated by said rate controller;
- a second channel processor coupled to receive said second program signal, said second program signal including a second audio signal and a second video signal, said second channel processor comprising:
  - a first data path providing a first bit reduction rate;
  - a second data path providing a second bit reduction rate which is greater than said first bit reduction rate of said first data path of said second channel processor; and
  - a channel controller for selectively causing the bit rate of said second video signal to be reduced by said first bit reduction rate or said second bit reduction rate in response to said rate reduction factor generated by said rate controller.

9. An apparatus as defined in claim 8 wherein said rate controller comprises:
- means for determining the combined data rate of said first and second program signals; and
- means for determining said rate reduction factor based on said combined data rate.

10. An apparatus as defined in claim 8 wherein said first channel processor additionally comprises:
- a demultiplexer for demultiplexing said first program signal into said first video signal and said first audio signal;
- a delay buffer coupled to receive said first audio signal, said delay buffer providing an adjustable time delay of said first audio signal; and
- a multiplexer for multiplexing said first audio signal together with said first video signal.

11. An apparatus as defined in claim 8,
- wherein said first data path of said first channel processor comprises means for passing said first video signal through said first channel processor without decompressing or recompressing said first video signal, and
- wherein said second data path of said first channel processor comprises:
  - first means for decompressing said first video signal;
  - first means for recompressing said first video signal; and
  - means for providing said first video signal from said first decompressing means to said first recompressing means.

12. An apparatus for processing a plurality of program signals including a first program signal having a first data rate and a second program signal having a second data rate, said apparatus comprising:
- a rate controller for generating a rate reduction factor based upon said data rates of said first and second program signals;
- a first channel processor coupled to receive said first program signal, said first program signal including a first video signal, said first channel processor comprising:
  - a signal decompression circuit through which said first video signal passes;
  - a signal compression circuit through which said first video signal passes, said signal compression circuit providing a variable amount of bit rate reduction; and
  - a channel controller for controlling the amount of bit rate reduction provided to said first video signal by said signal compression circuit processor based upon said rate reduction factor generated by said rate controller;
- a second channel processor coupled to receive said second program signal, said second program signal including a second video signal, said second channel processor comprising:
  - a signal decompression circuit through which said second video signal passes;
  - a signal compression circuit through which said second video signal passes, said signal compression circuit of said second channel processor providing a variable amount of bit rate reduction; and
  - a channel controller for controlling the amount of bit rate reduction provided to said second video signal by said signal compression circuit of said second channel processor based upon said rate reduction factor generated by said rate controller.

13. An apparatus as defined in claim 12 wherein one of said signal decompression circuits comprises an inverse quantizer and wherein one of said signal compression circuits comprises a quantizer.

14. An apparatus as defined in claim 13 wherein one of said channel processors additionally comprises:

an inverse VLE circuit through which one of said video signals passes;

a VLE circuit through which one of said video signals passes.

15. An apparatus as defined in claim 12 additionally comprising:

a multiplexer coupled to receive said first and second program signals from said first and second channel processors; and means coupled to said multiplexer for receiving said first and second program signals from said multiplexer and broadcasting said program signals to a plurality of locations remote from said multiplexer.

16. A system as defined in claim 15 wherein said broadcasting means comprises:

a transmitter coupled to receive said first and second program signals from said multiplexer;

a satellite coupled to receive said first and second program signals from said transmitter;

a receiver for receiving program signals from said satellite; and a decoder connected to receive program signals from said receiver.

17. A method of processing a program signal which includes a video signal, said method comprising the steps of:

(a) comparing a factor relating to the complexity of said video signal to a threshold;

(b) reducing the bit rate of said video signal by a first amount depending on whether said factor is greater than or less than said threshold; and (c) reducing the bit rate of said video signal by a second amount depending on whether said factor is greater than or less than said threshold.

18. A method as defined in claim 17 additionally comprising the steps of:

(d) comparing said complexity factor to a second threshold;

(e) reducing the bit rate of said video signal by a third amount depending on whether said factor is greater than or less than said second threshold.

19. A method as defined in claim 17 additionally comprising the steps of:

(d) multiplexing said video signal with a plurality of other video signals at a broadcast location to form a multiplexed signal; and (e) broadcasting said multiplexed signal to a plurality of locations remote from said broadcast location.

20. A method as defined in claim 17 wherein said step (c) comprises the step of routing said video signal through a data path having a quantization circuit and an inverse quantization circuit.

* * * * *